Figure 1:
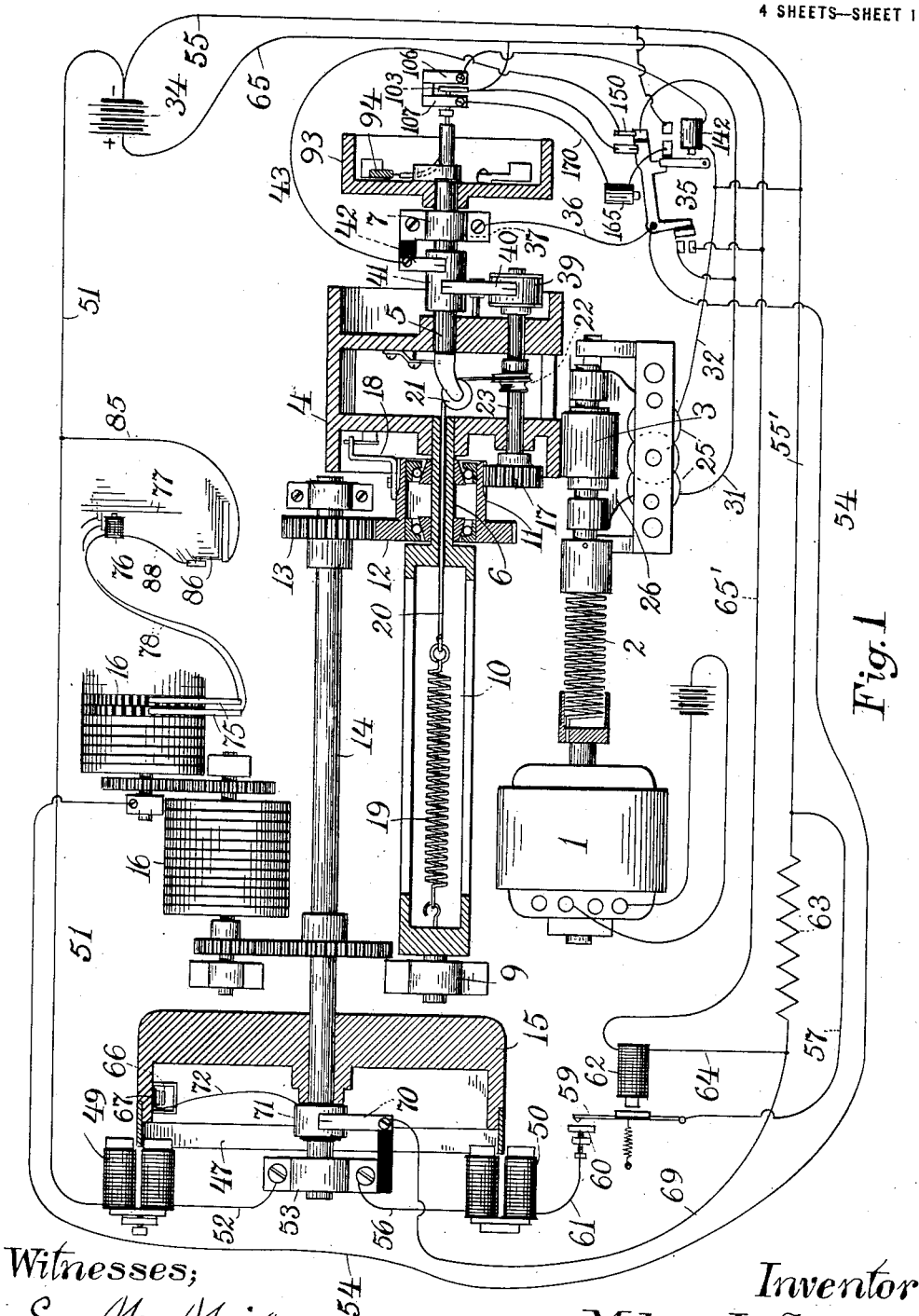

M. L. SEVERY.
SYNCHRONIZER.
APPLICATION FILED APR. 7, 1911.

1,163,473.

Patented Dec. 7, 1915.
4 SHEETS—SHEET 1.

Witnesses:
E. W. White
Harold W. Raymond.

Inventor
Melvin L. Severy,
By A. B. Upham.
Attorney.

M. L. SEVERY.
SYNCHRONIZER.
APPLICATION FILED APR. 7, 1911.

1,163,473.

Patented Dec. 7, 1915.
4 SHEETS—SHEET 2.

Witnesses;
Harold W. Raymond.
G. H. Waite

Inventor,
Melvin L. Severy;
By
A. B. Upham.
Attorney.

M. L. SEVERY.
SYNCHRONIZER.
APPLICATION FILED APR. 7, 1911.
1,163,473.
Patented Dec. 7, 1915.
4 SHEETS—SHEET 3.
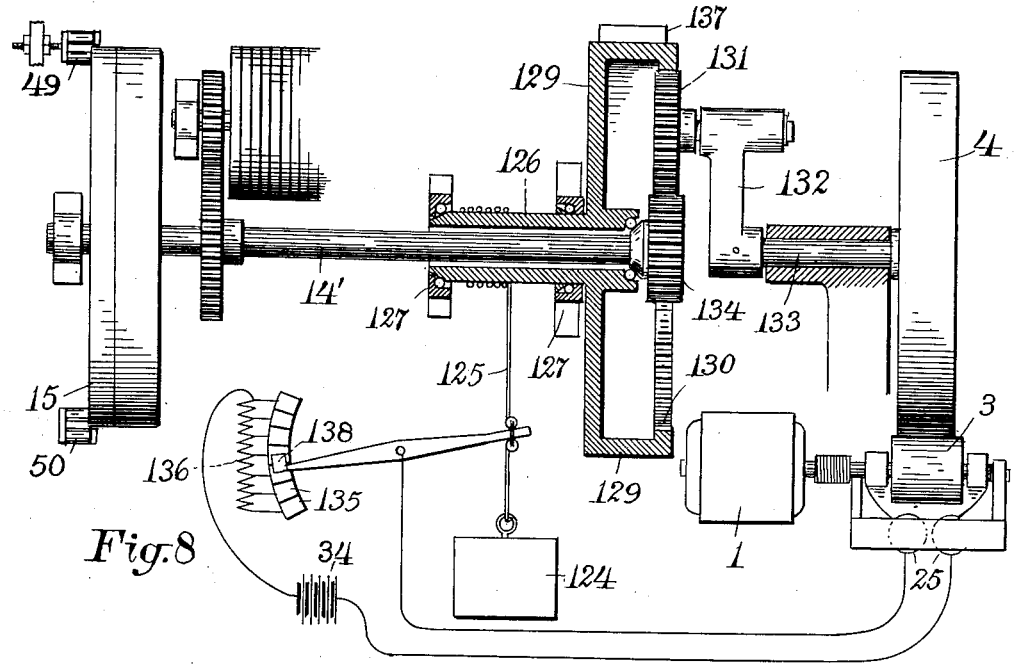
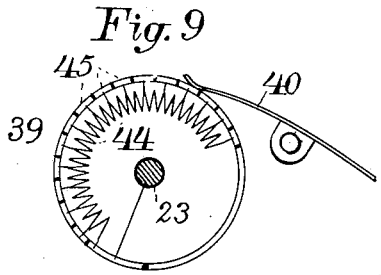
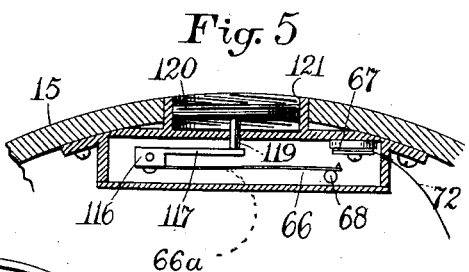
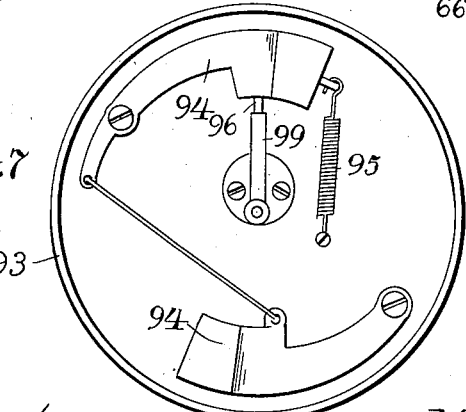
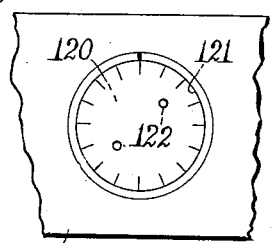
Witnesses:
Harold W. Raymond.
E. W. Waite
Inventor,
Melvin L. Severy;
By A. B. Upham.
Attorney.

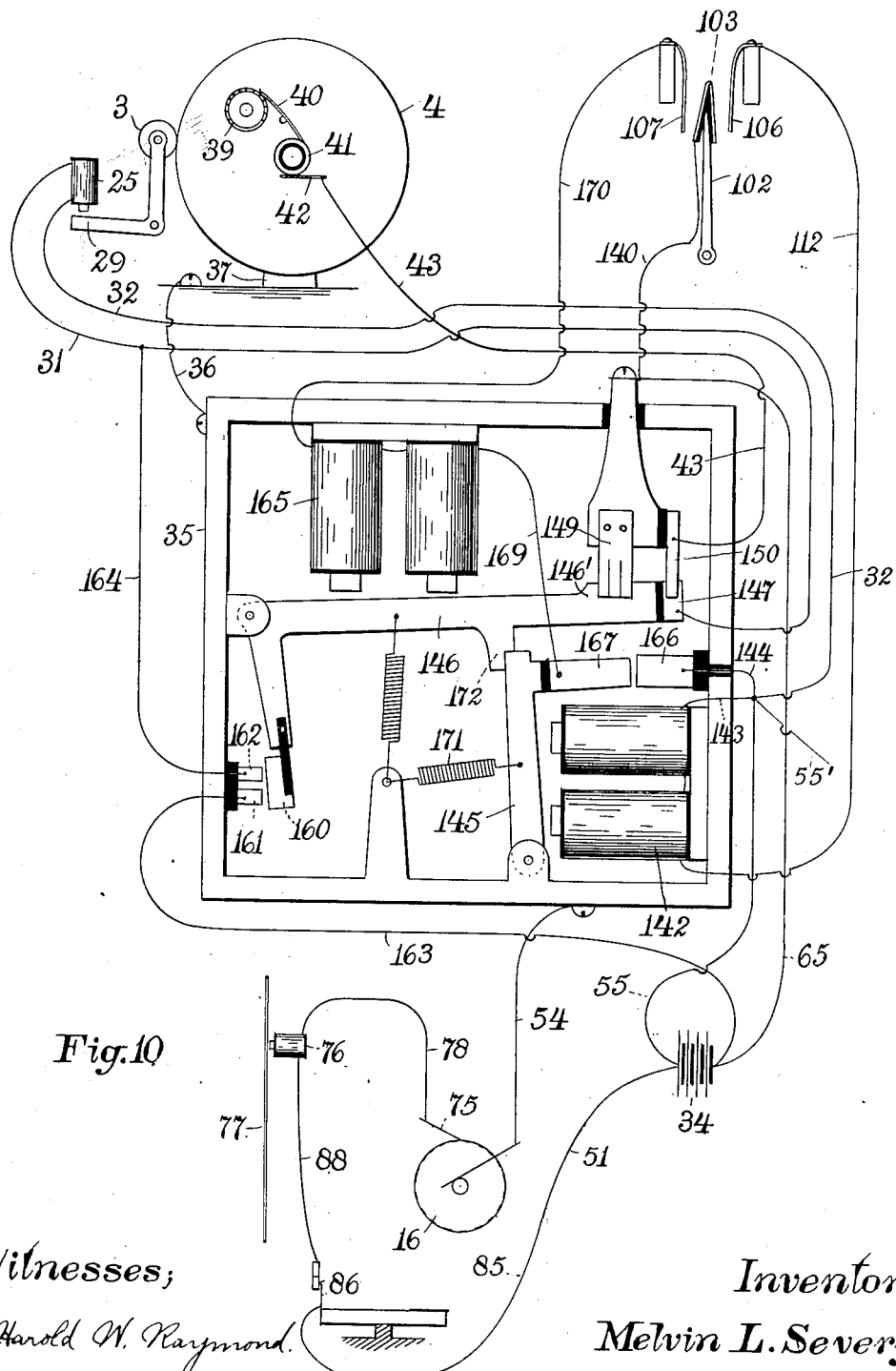

UNITED STATES PATENT OFFICE.

MELVIN L. SEVERY, OF ARLINGTON HEIGHTS, MASSACHUSETTS.

SYNCHRONIZER.

1,163,473.   Specification of Letters Patent.   Patented Dec. 7, 1915.

Application filed April 7, 1911. Serial No. 619,633.

*To all whom it may concern:*

Be it known that I, MELVIN L. SEVERY, a citizen of the United States, residing at Arlington Heights, in the county of Middlesex and Commonwealth of Massachusetts, have invented certain new and useful Improvements in Synchronizers, of which the following is a specification.

The object of this invention is the construction of improved means for controlling with practically perfect precision the motion of a rotating mechanism, and especially of the current interrupting devices of electric musical instruments wherein sonorous bodies are vibrated by magnetic impulses.

The present application is designed to cover broadly the synchronizer *per se*. In the drawings there is illustrated one contemplated application of such synchronizer, and the one for which primarily it is designed. In Patent No. 1,098,983 granted to me jointly with George B. Sinclair, and dated June 2, 1914, I have claimed a combination comprising a synchronizer with tuned sonorous bodies, electromagnets for throwing said bodies into vibration, and circuits and circuit interrupters or pulsators, for determining the number of vibrations per second of the sonorous bodies produced through the electromagnets, and I have illustrated and described therein a synchronizer which is adapted for the same general purposes as the particular form of synchronizer herein broadly claimed. It is to be understood, therefore, that I do not claim in the present application the musical instrument of which the synchronizer constitutes an element, or in other words do not claim the synchronizer in combination with the tuned sonorous bodies, pulsators, circuits, magnets, etc., but reserve that structure or combination for said patent. In certain other co-pending applications are shown, described and claimed, in some instances broadly and in others more specifically, devices which are designed primarily for the purposes set forth above. All matters set forth and claimed in co-pending applications filed in the joint names of myself and George B. Sinclair, or in the name of either of us, and not definitely expressed in the claims hereof, are expressly saved and reserved for one or another of said co-pending applications in which such matters are claimed or intended to be claimed. Among these co-pending applications may be noted the following joint applications: Serial No. 384,872 filed July 22, 1907; Serial No. 753,014 filed March 8, 1913; and Serial No. 754,475 filed March 15, 1913.

Figure 2:
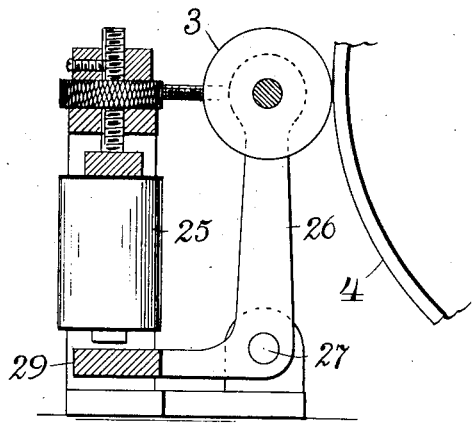
Figure 3:
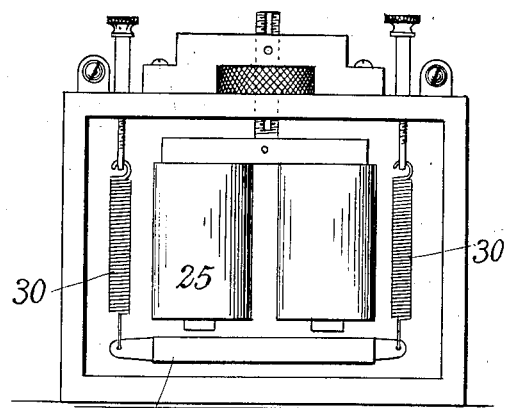
Figure 4:
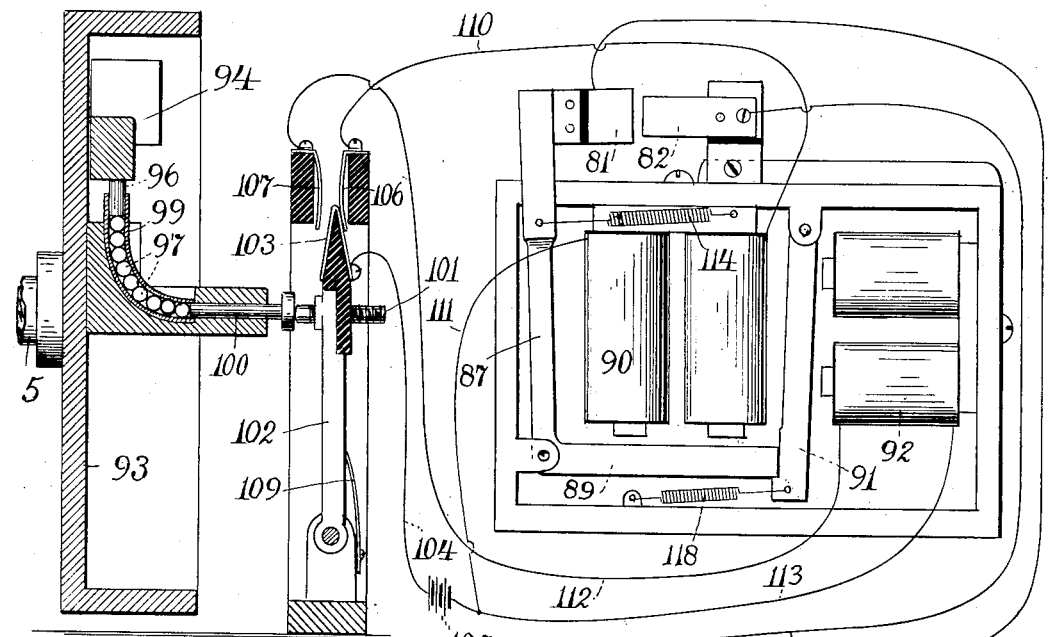

Referring to the drawings forming part of this specification, Figure 1 is a plan view, partly in section, of a synchronizer made in accordance with my invention. Fig. 2 is a sectional elevation of certain parts of the friction drive connected therewith. Fig. 3 is a front elevation of the same. Fig. 4 is an elevation, partly in section, of one form of cut-out device used in connection with the apparatus. Fig. 5 is a detail sectional view of the centrifugally-operated circuit closing finger and connected parts. Fig. 6 is a face view of the adjusting member thereof. Fig. 7 is a face view of the wheel and centrifugally operated parts of the cut-out device. Fig. 8 is a sectional view of a modified form of the synchronizer. Fig. 9 is a detail view of the variable resistance drum. Fig. 10 is a diagram illustrating the preferred form of cut-out device and its wiring.

Referring to Fig. 1, the reference numeral 1 designates a prime mover, preferably an electric motor, employed for the propulsion of the apparatus. This motor acts through a flexible coupling 2 for the rotation of the pulley or roll 3 made of or surfaced with rawhide, in order to rotate the drum 4. The latter is rigidly mounted on two spindles 5 and 6 turning in bearings 7 and 9 respectively. The spindle 6 is enlarged and chambered, as at 10, and carries loosely mounted between said enlargement and said drum a pinion 11 and a gear 12. Said gear meshes with a gear 13 fixed on the shaft 14 which carries the drum or fly-wheel 15, said shaft being geared to the pulsation devices 16. Said pinion 11 and gear 12 are integral, or otherwise fixed together, and serve to convey motion to the gear 13 and shaft 14 from the drum 4 by means of the pinion 17 rotatably carried by said drum, and held from more than a limited rotation by stops 18. Anchored at one end in the chamber 10 is a helical spring 19 connected at its free end by means of a cord 20 passing about a pulley 21 to a fusee 22 fixed on the shaft 23 of said pinion 17. It is the tension of said spring acting upon said fusee which holds the pinion 17 from free movement, and which causes the motion of the drum 4 to rotate the driven mechanism 15, 16. The tension of said spring being properly adjusted or proportioned to the work required to drive the driven mechanism, any sudden increase in the driving mechanism's speed will act on said spring to elongate it, while a sudden diminution in the driving speed will be followed by the contraction of said spring. The purpose of the fusee is to keep the action of the spring 19 constant upon the pinion 17 throughout said spring's free movement. When the acceleration of the drum 4 is sufficient to overcome the holding power of the spring, then the pinion 17 will turn, together with its shaft and fusee, winding the cord 20 about the latter and stretching the spring. This movement of said shaft rotates the resistance drum 39, in a direction to bring resistance into the circuit of the electromagnet 25 and thus to diminish the magnetically applied friction between the roll 3 and drum 4. This diminution should occur at the inception of increase of speed of the drum 4 as related to the speed of shaft 14. The energy of magnet 25 will, of course, vary in accordance with the amount of resistance introduced into its energizing circuit. In order that the pressure of the roll 3 against the drum 4 may be controlled by the magnet 25, said roll is mounted in the L-shaped rocking frame 26, supported at the angle of its upright and horizontal members on pivots 27, (see Fig. 2), and provided at the outer extremity of its horizontal member with an armature 29 standing within the field of attraction of said magnet 25. Adjustable springs 30 (Fig. 3), maintain said armature always within the field of the magnet, and preferably cause a light pressure of the roll 3 against the drum 4. As shown in Figs. 1 and 10, current is supplied from the source 34 to said electromagnet 25 through two different circuits, one being comparatively direct and employed when the mechanism is first set in motion and when it is running slower than the predetermined speed, and the other circuit being adapted to embrace said resistance 39 when the mechanism is at or nearly to the predetermined speed. Both circuits will be described more fully hereinafter, but the latter circuit comprises the wires 31 and 32 connected with the cut-out device 35, which is also to be described later and which is connected with the frame of the mechanism through the wire 36 attached to a bearing 37. The variable resistance drum 39 is in circuit with such frame through the drum 4 and shaft 23, and is connected to part 150 of said cut-out device through the brush 40, insulated sleeve 41, brush 42 and wire 43. The construction of said variable resistance drum 39 is shown in Fig. 9, 44 being the resistance formed in any suitable manner, and 45 being contacts connected with different sections of said resistance. When said drum is given a partial turn in one direction, the brush 40 meets contacts successively cutting out sections of resistance, while a turn in the opposite direction successively cuts in sections of resistance. To accurately control the speed of the driven mechanism, the fly-wheel 15 is provided with an annulus 47 preferably of copper, revolving between the poles of the two electromagnets 49, 50. The magnet 49 which preferably is mechanically adjustable, is connected by a wire 51 to said source 34, and by a wire 52 to the bearing 53 which has suitable connections, to be hereinafter described, with the opposite pole of said source, and such magnet is, in operation, kept constantly energized and hence constantly imposes a sensibly uniform resistance or drag to the rotation of said annulus and fly-wheel, 15. In addition to this constant resistance, a variable or intermittent resistance is provided for the fly-wheel 15 by means of said electromagnet 50 wired to one of the poles of the source 34 through the wire 56, bearing 53, machine frame, and wire 54 to said cut-out 35 and certain connected parts, and finally through the wire 65; the return circuit from the source comprising the wires 55, 55', and 57, contact finger 59, stationary contact 60 and wire 61. This circuit is broken, whenever the fly-wheel 15 revolves at less than the predetermined speed, by the electromagnet 62 acting upon said contact finger 59, said magnet being energized by current from the source 34 through the wires 55, 55', resistance 63, and wire 64 to said magnet, and back through the wires 65', 65 to said source. The instant said fly-wheel reaches the predetermined speed, the centrifugal contact finger 66 (see Fig. 5) meets the contact 67 and thereby shunts most of the current, passing it around said electromagnet 62. This sufficiently demagnetizes the electromagnet 62 to permit the contact finger 59 to engage its contact 60, thereby switching current to the electromagnet 50 and causing the latter to apply sufficient resistance or drag to the annulus 47 to keep the fly-wheel 15 from further gain in speed. The circuit thus shunted about the electromagnet 62 consists of the wires 55, 55', resistance 63, wire 69, brush 70, insulated collar 71, wire 72, insulated contact 67, contact finger 66 (Fig. 5), the metal of the fly-wheel 15, shaft 14, and suitable connections to be later described, back to the source. The reason the current is thus shunted is because the resistance of said electromagnet 62 is so much greater than that of the circuit members 69, 70, 71, etc., that insufficient current is left for said electromagnet to enable it to attract its contact finger 59, against the action of its spring. The resistance of the constant magnet 49 to the fly-wheel's motion is arranged (by varying by mechanical adjustment the amount of the copper annulus included between its poles) very nearly to equal the excess of driving power of the spring 19 over and above that absorbed by the driven mechanism so as to reduce as much as is feasible the necessary retarding influence of the magnet 50 in maintaining synchronism.

The electric musical instrument, for which this synchronizer is more especially designed, comprises toothed disks 16, brushes 75, electromagnets 76 to which the proper electric impulses are delivered, and tuned sonorous bodies, as strings 77, vibrated thereby. Inasmuch as when the current to said electromagnets is being rapidly interrupted by said toothed disks, far less current is delivered than when said disks are motionless, and the current is therefore continuous, it is desirable to provide means for cutting out the current to said electromagnets whenever for any reason the disks or interrupters happen to stop, or greatly to decrease their speed. One form of a cut-out for such purpose is illustrated in Fig. 4, wherein a contact 81 is shown as carried by a bell-crank lever 87; and is joined by a wire 83 to the current-source 34, while the associated contact 82 is joined by a wire 85 to the action brushes 86, and thence through the action rail and the wires 88 to the electromagnet 76; the remainder of the return circuit embracing the brushes 75, interrupter disks 16 and wire 84 back to said source. The arm 89 of said bell-crank lever is in the field of the electromagnet 90, which, when energized, raises said arm and disengages the contact 81 from the contact 82. In this position, a detent 91 holds it against the action of the spring 114 until the energization of the electromagnet 92 releases it therefrom; a spring 118 moving said detent into such engagement. For suitably energizing the electromagnets 90, 92 and thereby opening and closing said contacts, means are provided for closing the circuits to the respective electromagnets through a swinging arm controlled by the speed of the mechanism. For this purpose, a wheel 93 is fixed on the spindle 5 (Figs. 1, 4 and 7) and provided with centrifugal arms 94 drawn inward by a spring 95 (Fig. 7); said arms acting upon the plunger 96 (Fig. 4), balls 97 movable in the curved tube 99, and the plunger 100 abutting against the adjusting screw carried by the rocking arm 102. The latter being pressed in resilient opposition to said devices by a spring 109, the cap 103 on the free end of said rocking arm is brought thereby into touch with one or the other of the contacts 106 or 107, depending upon whether or not the speed of the wheel 93 is sufficient to throw its centrifugal arms outward. Said cap is insulated from all other parts, except one pole of the source of current 105 with which it is connected through a wire 104. The contact 106 is connected by a wire 110 to the electromagnet 90, the latter being joined by a wire 111 to one pole of said source 105, while the contact 107 is connected by a wire 112 to the electromagnet 92, which is also joined by a wire 113 to said source. Consequently, when the wheel 93 is rapidly rotated, the centrifugal arms swing outward and permit the rocking arm 102 to present its cap to the contact 107 and thereby energize the electromagnet 92, attracting the detent 91 and permitting the bell-crank lever 87 to be moved by its spring 114 to carry its contact 81 into touch with the contact 82, thus switching current to the musical part of the instrument. As the wheel 93 slows down, the cap 103 swings over into touch with the contact 106, and thereby causes the energizing of the electromagnet 90, and the disconnection of contacts 81, 82 and consequent cutting out of current to said musical part of the instrument.

One of the very important features of this synchronizer is the construction of the contact finger 66 (see Fig. 5) carried by the fly-wheel 15. This is of thin spring metal, rigid with the block 116 which is pivotally supported and provided with an arm 117. Said arm is pressed downward and the tension increased upon said spring finger, by a pin 119 carried by the disk 120 whose periphery is threaded and fitted within a correspondingly threaded socket 121. The outer surface of this disk being provided with a pair of holes 122 (see Fig. 6) to receive the points of an instrument by means of which to turn it and thus adjust the spring tension, and having graduations to determine the degree of adjustment, such adjustment is not only most delicately controlled, but it remains set. This permanency of adjustment is obtained by having the periphery of the disk 120 threaded, instead of threading the pin 119; the greatly increased threaded peripheral surface insuring sufficient friction to keep the same from undesigned turning. In order to render the contact finger 66 of the maximum sensibility to changes in centrifugal energy, and as little as possible affected by gravitation, I prefer to make the same of quite thin spring metal, and with a normal bend which would tend to return it to a horse-shoe curvature, as indicated in the dotted lines 66$^a$ in Fig. 5. In other words, if the spring is not held by the stop 68 in the substantially straight line shown in said figure, and is otherwise unhindered, it will take the curved shape 66$^a$. The change in shape from the curve 66$^a$ to the position at the stop 68 is that which the spring would accomplish between the two limits of the flywheel's speed bounded by rest on the one hand, and very nearly the full predetermined speed of the driven mechanism. But by holding the spring finger, as by the stop 68, close to its contacting position, it is saved the preliminary bending from its curve 66ª, and is thereby saved from injury, its containing box is permitted to be materially more compact, and it is rendered more sensitive. That this spring is more sensitive than a stiffer one normally nearly straight, is evident when it is considered that the latter must start from a position of no stress as the fly-wheel begins to revolve, to its position of maximum stress when the predetermined speed is reached, and its entire journey be no more than what the flexible spring 66 traverses when the fly-wheel increases from nearly to full predetermined speed.

In Fig. 8 is illustrated a modification of the synchronizer above described, the same having a weighted cord 125 wound on a barrel 126, instead of the spring 19 and fusee 22 shown in Fig. 1. This barrel turns freely upon bearings 127 independently of the shaft 14', and carries a wheel 129 having a toothed flange 130. Meshing with the latter is a pinion 131 rotatably supported in a crank arm 132 rigid with the shaft 133. The latter has a drum 4 to which power is communicated by the rawhide pulley 3 revolved by the motor 1. On the end of the shaft 14' is a pinion 134 meshing with said pinion 131. If, now, the wheel 129 could freely revolve, the motion of the crank arm 132 would not necessarily affect the shaft 14' and with it the driven mechanism; but inasmuch as said wheel is yieldingly held from rotation by the weight 124, said shaft 14' (with connected parts) is adapted to be suitably rotated by the motion of said arm 132 carrying said gear 131. During such rotation, the wheel 129 remains normally almost or quite stationary, moving only when relative motion between the parts 15 and 4 undergoes a change. By having said weight 124 proportioned to considerably more than counterbalance the normal moment of resistance of the driven mechanism, and providing an adjustable retarding factor, as the electromagnet 49 and connected devices shown in Fig. 1, to take up the major portion of this excess of driving force exerted by said weight 124, considerable changes in load may be adjustably taken care of without unduly overburdening the intermittent retarding magnet 50 (shown in Fig. 1) which also is used in connection with the device shown in Fig. 8. In practical operation, any excess of speed on the part of the motor will wind up more or less of the cord 125, shift the brush 138 to a contact 135 to cut in increased resistance 136, and thereby to diminish the current delivered by the source 34 to the electromagnet 25. By thus decreasing the friction between the pulley 3 and drum 4, the speed of the latter tends to become slower, but any such slowness, if excessive, instantly causes the cord 125 to unwind and the brush to cut out resistance and so to increase the friction between said pulley and drum. When in operation, the speed of the drum 4 falls, the roll 3 is pressed more strongly against the drum 4 and consequently accelerates the latter. In this way, the correct speed relation is maintained between the drum 4 and the fly-wheel 15 so that said fly-wheel is always driven with an urgency dependent upon the weight 124 so long as said weight is free to rise and fall, which is normally the case except in stopping and starting. To suitably control the toothed drum 129 when stopping and starting the mechanism, a friction pad 137 is provided, which being made to bear strongly against the periphery of said drum at such time, keeps the latter from undue rotation until the driven mechanism has substantially reached rest or its predetermined velocity.

In the preferred form of the cut-out 35 shown in Figs. 1 and 10, the arrangement is as follows: The swinging contact arm 102 which in Fig. 10 is shown in diagram, is preferably similar in construction and operating devices to that shown in Fig. 4, and is connected through the wires 140, 65 to the current source 34. When said arm swings over to carry its cap 103 into touch with the contact 106, as it does when the wheel 93 unduly slows down and the centrifugal arms 94 swing inward, as previously described, current is delivered from said source through wires 65 and 140 and said cap and contact and wire 12 to the electromagnet 142; returning to said source through the wires 143, 55. Said electromagnet being thus energized, its pivoted armature 145 is attracted, and the pivoted armature 146 permitted to fall. The latter motion separates the contacts 146' and 147 from the contacts 149 and 150 respectively, thereby breaking the circuits both to the electromagnets 76 and the resistance 39; the circuits broken being as follows: The current from the source 34 through the wire 65 and contact 149, would, were the contacts not broken, flow thence through the contact 146' and armature 146 to the frame 35, and thence through the wire 54 to the disks 16, brushes 75, wires 78, electromagnets 76, wires 88, action brushes 86, and wires 85, 51 back to said source. But said contacts being separated, such circuit is broken and no current can pass through said pulsation electromagnets 76 and connected parts. The circuit broken by the said contacts 147 and 150 consists of the wires 55, 32 from the source 34, to the electromagnet 25, wire 31 therefrom to said contacts 147, 150, wire 43, brush 42, sleeve 41, brush 40, resistance drum 39, drum 4, bearing and frame thereof, wire 36, frame 35, armature 146, contacts 146' and 149 and wire 65 back to said source 34, thus cutting out both the said resistance drum and the magnet 25, so far as this fusee-circuit is concerned, whenever the pulsation devices are cut out. At the same time that said contacts 146' and 149, and 147 and 150 are separated by the dropping of the armature 146, the knife 160 bridges the contacts 161, 162 and thereby completes the circuit from the source 34 through the wire 163, the wires 164 and 31 to the electromagnet 25, and thence through the wires 32, 35 back to said source, so that said electromagnet is kept energized even when the resistance drum 39 is cut out of circuit.

The reason why the two circuits are provided for the electromagnet 25 as above referred to, and as just described, is that thereby a strong and comparatively unimpeded current is delivered to said electromagnet when the machinery is being started and speeding up to its desired rate. This gives a maximum gripping-pressure between the roll 3 and drum 4 and insures against undue slippage while the inertia of the driven mechanism is being overcome. When, however, the mechanism has been brought nearly to its predetermined speed, then the cut-out switches the electromagnet 25 over into the control of the circuit embracing the resistance 39, inasmuch as much less energy is required for maintaining the motion of the driven mechanism and hence the roll 3 does not need to press the drum 4 so strongly. When, on the other hand, the pulsation devices and other parts of the driven mechanism are speeded up approximately to their predetermined rate, then the arm 102 is permitted to swing toward the left and to put its cap 103 into touch with the contact 107. This energizes the electromagnet 165 (Fig. 10), the circuit thereto from the source comprising the wires 55, 144, contacts 166' and 167, (since the same were put into engagement when the driving and driven mechanisms were running unduly slow as above described), wire 169 to said electromagnet 165, wire 170, contact 107, cap 103 and wires 140, 65 back to said source. This energization of the electromagnet 165 acts instantly to snap the armature 146 upward, where it is caught and locked in such position by the armature 145 which is swung by its spring 171 in beneath the saddle 172. Thus held, the contacts 166 and 167 are disengaged and the circuit broken to the electromagnet 165 so that the same is no longer alive, and the contacts 146' and 149, and 147 and 150 closed so that current is switched to the pulsation devices and to the variable resistance drum, and the electromagnet 25 is put into the control of the fusee-circuit, instead of the circuit controlled by the bridge 160. At the same time the knife 160 is disconnected from the contacts 161 and 162, so that the only energizing current to the electromagnet 25 is that which passes thereto through the resistance drum 39.

The cut-out devices above described preclude burning or fusing of parts incident to accidental slowing or stopping of the pulsation devices while the current is still flowing through the same, as already referred to; nor can the musical instrument be made to sound until the said devices are speeded up approximately to their predetermined rate, at a point where their exact speed can be controlled with practically absolute perfection by the synchronizer. Moreover, without the cut-out devices, it would be impossible to set the synchronizer into operation, except after a lengthy delay; but with the devices as set forth, when the mechanism is started a full current is delivered to the electromagnet 25 and a suitably strong engaging pressure given between the roll 3 and drum 4.

It will be seen that this synchronizer consists of three main parts of groups of elements, the first being the driving mechanism comprising the prime mover, as the motor 1, and the transmission mechanism, comprising the roll 3 and drum 4; the second being the interposed reactive motion absorber and driving regulator, comprising the spring 19, fusee, resistance drum, etc.; and the third being the driven mechanism comprising the shaft 14, fly-wheel 15, pulsation devices 16, etc.

It has been found in practice that a single electromagnet may be made to perform the two functions of the two electromagnets 49 and 50, by having a continuous current which may or may not be variable in amount delivered thereto, upon which is intermittently superimposed by the system shown in connection with the electromagnet 50, a further amount of current.

What I claim as my invention and for which I desire Letters Patent is as follows, to wit:—

1. The combination with a driven mechanism, of a driving mechanism including a prime mover and a variable power transmission means, and means adapted to be controlled by the variation of the speed relation subsisting between said driven and driving mechanism, for varying the effect of said power transmission means.

2. The combination of a driven mechanism, a driving mechanism including a prime mover and a variable power transmission means, and means adapted to increase the degree of effect of said transmission means when the speed of the driven mechanism increases in greater proportion than does the speed of the driving mechanism, and to decrease said effect when the speed of the driven mechanism decreases in greater proportion than does the speed of the driving mechanism.

3. The combination of a driving mechanism and a driven mechanism, the former comprising a friction drive, and means adapted to increase the friction of said drive when the speed of the driven mechanism increases in greater proportion than does the speed of the driving mechanism, and to decrease the friction of said drive when the speed of the driven mechanism decreases in greater proportion than does the speed of the driving mechanism.

4. The combination with a prime mover and a driven mechanism, of a friction drive for the latter, a yielding connection between said prime mover and said friction drive, electromagnetic means for varying the pressure between said friction drive and driven mechanism, and automatically operated means adapted to control said electromagnetic means.

5. The combination with a prime mover and driven mechanism, of a power-transmission factor interposed between the same, electromagnetic means adapted to control the degree of influence of said factor, the same including a source of current and a circuit, a variable resistance in said circuit, a yielding connection between said factor and driven mechanism, and means controlled thereby for varying said resistance.

6. The combination with a prime mover and a driven mechanism, of a power transmission means including a drum interposed between the said prime mover and mechanism, electromagnetic means adapted to control the degree of effect of said transmission means, said electromagnetic means including a source of current and a circuit, a variable resistance device in said circuit, and means controlling said resistance device by the variation of speed relation subsisting between the driven mechanism and said drum.

7. The combination with a prime mover and driven mechanism, of a friction drive including a drum interposed between the same, electromagnetic means including a source of current and a circuit adapted to control the degree of friction of said drive, a variable resistance in said circuit, and means controlling said resistance by the variation of the speed relation subsisting between the driven mechanism and said drum.

8. The combination with a driving mechanism and a driven mechanism, of a variable power-transmission means interposed between the same, and means adapted to increase the effect of said power-transmission means when the speed of the driven mechanism increases in greater proportion than does the speed of the driving mechanism, and to decrease the effect of said power-transmission means when the speed of the driven mechanism decreases in greater proportion than does the speed of the driving mechanism, the effect of said transmission means throughout its variations being controlled by, and proportioned to the variation of the speed relation subsisting between the driven mechanism and the primarily driven part of the variable power-transmission means.

9. The combination with a driving mechanism and driven mechanism, of a motion absorbing factor of constant mechanical resistance throughout an appreciable portion of its range interposed between said driving and driven mechanism, said motion absorbing factor, with associated parts, being in operation adapted to keep itself normally within the range of its constant action.

10. The combination with a driven mechanism and a prime mover, of a motion absorber adapted to be constant in its urgency throughout an appreciable part of its range, interposed between said driven mechanism and prime mover, said motion absorber being normally adapted continuously to impel said driven mechanism with constant urgency.

11. The combination with a driven mechanism and a prime mover of an interposed motion absorber of constant urgency throughout an appreciable part of its range, and means whereby said motion absorber is in operation normally maintained within its said range of constancy.

12. The combination with a driven mechanism and a prime mover, of an interposed motion absorber adapted to be of constant urgency throughout an appreciable part of its range, and to transmit a constant amount of energy to said driven mechanism, and means whereby in operation said motion absorber is normally kept within its range of constant urgency.

13. The combination with a prime mover and a driven mechanism, of a friction drive, including a drum interposed between the prime mover and driven mechanism, electromagnetic means including a source of current and a circuit adapted to control the degree of friction of said drive, a chambered spindle in axial alinement with said drum but rotatable independently of the same, a tension spring anchored in said chambered spindle, a pinion carried by said drum eccentric therewith, a variable resistance drum turning with said pinion, a fusee turning with said pinion, a flexible link wound on said fusee and attached to said spring and suitably guided, a pinion loosely mounted on said spindle and meshing with the first-named pinion, means for transmitting the motion of the second-named pinion to said driven mechanism, and a brush contacting with said resistance drum, said drum and brush forming parts of said circuit.

14. The combination with a driven mechanism and a prime mover, of a drum operatively connected with the driven mechanism, a drive roll, a flexible coupling between the latter and the prime mover, a pivoted bearing frame for said roll, an armature rigid with said frame, an electromagnet located with said armature in its field and adapted to press said roll against said drum, a source of current and a circuit, a variable resistance in said circuit, and automatically operated means for varying said resistance.

15. The combination of a prime mover, a driven mechanism, an interposed yielding factor of constant urgency throughout an appreciable part of its motion, means for keeping said factor within the range of constant urgency in operation, and means for altering the resistance of said driven mechanism whereby the urgency of said yielding factor shall impel it at a predetermined speed.

16. The combination with a driven mechanism and a driving mechanism, of means for exerting an inductive retarding influence upon said driven mechanism, and means controlled by the speed of the driven mechanism for varying said inductive retarding influence.

17. The combination with a prime mover and a driven mechanism, of a metallic body adapted to be rotated with the driven mechanism, means for producing a magnetic drag upon said body, and means controlled by the speed of the driven mechanism for varying the amount of said drag.

18. The combination with a prime mover and a driven mechanism, of a continuous metallic body adapted to be rotated with the driven mechanism, a stationary electromagnet receiving said body between its poles, means for energizing said electromagnet, and means controlled by the speed of the driven mechanism for varying the strength of said electromagnet.

19. The combination with a prime mover and a driven mechanism, of a continuous metallic body adapted to be rotated with the driven mechanism, stationary electromagnets receiving said body between their poles, and means for delivering electricity to said electromagnets, the means for such delivery to one of the electromagnets being automatically controlled by the speed of the driven mechanism.

20. The combination with a prime mover and a driven mechanism, of a continuous metallic body adapted to be rotated with the driven mechanism, an electromagnet having its poles embrace a section of said body, a source of current, an uninterrupted circuit between said electromagnet and source, a second electromagnet having its poles embrace a section of said body, and means for switching current to the second-named electromagnet when the speed of the driven mechanism reaches a predetermined height.

21. The combination with a prime mover and a driven mechanism, of a copper annulus rotated by the driven mechanism, means for giving a continuous resistance to such rotation, an electromagnet having its poles embrace a section of said annulus, a source of current, an electromagnet in circuit with said source, a part of said circuit being a predetermined resistance, a contact finger controlled by the second-named electromagnet, a connection between said finger and one pole of said source cutting out said resistance, a stationary contact in engagement with said finger when the second-named electromagnet is materially reduced in magnetism, a connection between the first named electromagnet and said stationary contact, connection between the first-named electromagnet and the other pole of said source, and means for breaking the last-named connection when the speed of the driven mechanism is less than a predetermined height.

22. The combination with a prime mover and a driven mechanism, of a friction drive between the same, means for diminishing the degree of friction in said drive when in operation the speed of the prime mover reaches a predetermined height, and means for applying resistance to the driven mechanism when its speed reaches a predetermind height.

23. The combination with a prime mover and a driven mechanism, of a friction drive between the same, electrical means for deminishing the degree of friction in said drive when in operation the speed of the prime mover reaches a predetermined height, and means for applying magnetic resistance to the driven means when its speed reaches a predetermined height.

24. The combination with a prime mover and a driven mechanism, of a variable power transmission means between the same, electric means including a source of current and a circuit controlling said transmission means, a variable resistance in said circuit controlled by the speed relation subsisting between said transmission means and said driven mechanism, and means controlled by the speed of the driven means adapted to cut out the current to said variable resistance when the speed of the driven means is below a predetermined rate.

25. The combination with a driven mechanism and a driving mechanism, of electromagnetic speed-controlling devices embracing a source of current, and circuit, including a spring finger and contact rotated by the variation of the driven mechanism, said spring finger being a leaf spring of thin metal given a normally free condition far away from said contact, but provided with a stop for holding the end of the spring near said contact.

26. In combination with a prime mover, and with mechanism driven thereby and requiring to be maintained at uniform speed, means for controlling the speed of said driven mechanism, the same including a centrifugally operable, flexible, contact-making finger curved to have a pronounced and permanent set or curvature in a direction opposed to that of the movement imparted to it by centrifugal action when in operation.

In testimony that I claim the foregoing invention, I have hereunto set my hand this 6th day of April, 1911.

MELVIN L. SEVERY.

Witnesses:
GEORGE F. WALES,
A. B. UPHAM.